(12) United States Patent
Kim et al.

(10) Patent No.: US 7,773,627 B2
(45) Date of Patent: Aug. 10, 2010

(54) METHOD AND APPARATUS FOR ALLOCATING TRANSMISSION OPPORTUNITY IN COMMUNICATION SYSTEM

(75) Inventors: Eun-Kyung Kim, Daejeon (KR); Kyung-Soo Kim, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 713 days.

(21) Appl. No.: 11/600,275

(22) Filed: Nov. 15, 2006

(65) Prior Publication Data
US 2008/0025342 A1    Jan. 31, 2008

(30) Foreign Application Priority Data
Nov. 15, 2005    (KR) .................... 10-2005-0108959

(51) Int. Cl.
*H04J 3/16*    (2006.01)
*H04J 3/22*    (2006.01)

(52) U.S. Cl. .................... 370/468; 370/395.4; 370/252

(58) Field of Classification Search ................ 370/468, 370/252, 449, 332, 338, 349, 230; 455/453, 455/437
See application file for complete search history.

(56) References Cited

U.S. PATENT DOCUMENTS

| | | | |
|---|---|---|---|
| 6,940,831 B1 * | 9/2005 | Omi et al. ................ 370/310.1 |
| 2002/0147022 A1 * | 10/2002 | Subramanian et al. ...... 455/453 |
| 2003/0063563 A1 * | 4/2003 | Kowalski .................... 370/230 |
| 2005/0157745 A1 * | 7/2005 | Fujii et al. .................. 370/449 |
| 2005/0174973 A1 * | 8/2005 | Kandala et al. ............. 370/338 |
| 2006/0045051 A1 * | 3/2006 | Floros et al. ................ 370/332 |

* cited by examiner

*Primary Examiner*—Ricky Ngo
*Assistant Examiner*—David Oveissi
(74) *Attorney, Agent, or Firm*—The Farrell Law Firm, LLP

(57) ABSTRACT

In an apparatus for allocating a transmission opportunity (TXOP) of a communication system, the amount of transmittable data of the respective terminals during a first TXOP allocated to the respective terminals is calculated based on data rates of the respective terminals, an average data amount for the respective terminals is calculated from the calculated amount of data, and a second TXOP of the respective terminals is calculated based on the average data amount to allocate the second TXOP to the corresponding terminal.

11 Claims, 6 Drawing Sheets

METHOD AND APPARATUS FOR ALLOCATING TRANSMISSION OPPORTUNITY IN COMMUNICATION SYSTEM

PRIORITY

This application claims priority under 35 U.S.C. §119 to a Korean application filed in the Korean Intellectual Property office on Nov. 15, 2005 and allocated Serial No. 10-2005-0108959, the contents of which are incorporated herein by reference.

BACKGROUND OF THE INVENTION (a) Field of the Invention

The present invention relates to a device and method for allocating a transmission opportunity to a plurality of terminals in a communication system.

(b) Description of the Related Art

Recently, the Institute of Electrical and Electronics Engineers (IEEE) 802.11 standard has been used as a communication system, particularly as a wireless local area network (LAN). The IEEE 802.11 wireless LAN is robust in terms of transmission failure. IEEE 802.11b using a 2.4 GHz industrial scientific medical (ISM) band supports a transmission speed up to 11 Mbps, and IEEE 802.11a uses orthogonal frequency division multiplexing (OFDM) in a 5 GHz band and supports a transmission speed up to 54 Mbps. In addition, the IEEE 802.11g standard that has been lately approved has a comparatively short distance, but it supports a quick transmission speed of up to 54 Mbps.

In the IEEE 802.11 wireless LAN, data are transmitted to a terminal by two methods. One of the two methods is a distributed coordination function (DCF) through a contention between terminals, and the other is a point coordination function in which a polling operation is performed by a controlling operation of a base station. In a DCF mode, all terminals may use channels with the same probability, and a priority between terminals is not considered. In a PCF mode, a central controlling polling function is used, in which a center base station controls services for the terminals. That is, the base station polls the terminals to give the terminals an opportunity for transmitting a frame.

In IEEE 802.11e, a quality of service (QoS) is provided by a hybrid coordination function (HCF) in which the DCF mode and the PCF mode in the IEEE 802.11 are combined. The QoS is guaranteed by providing respective access categories (AC) for each QoS and defining different parameters for each AC. In an HCF mode, an enhanced DCF (EDCF) increasing performance of the DCF mode according to the AC is suggested, and a transmission opportunity (hereinafter referred to as a "TXOP") for continuously transmitting various frames without any contention for a predetermined time is provided to guarantee the QoS.

FIG. 1 shows a diagram representing the TXOP in the IEEE802.11e.

As shown in FIG. 1, a polling method is used to avoid a contention between wireless terminals. When obtaining a wireless controlling authority, a base station transmits a QoS contention-free poll (QoS CF Poll) frame to a terminal including data to transmit. The QoS CF-Poll frame includes a TXOP limit value, and the TXOP limit value is allocated to the terminal. When a polled terminal includes the data to transmit, various data frames are transmitted in the TXOP limit value. After the respective frames are transmitted, an acknowledge signal (ACK) is transmitted, and the respective frames and the respective ACKs are transmitted after a shorter interframe space (SIFS) time. In addition, a time gap may be provided in the TXOP limit value after the last frame and the ACK signal are transmitted.

In a communication system having a multi-data rate (e.g., a multi-rate IEEE 802.11e wireless LAN system), a plurality of terminals have respective data rates. A fixed TXOP according to traffic classification of the IEEE 802.11e is applied to provide the same service in the above system. However, when a high speed terminal and a low speed terminal transmit traffic requiring the same QoS requirement, different amounts of data may be transmitted for a predetermined time. For example, when the two terminals transmit data of the same priority, the amount of data to be transmitted varies according to a transmission speed for a given time due to the fixed TXOP, and therefore different service qualities may be provided according to the transmission speed of the respective terminals.

SUMMARY OF THE INVENTION

The present invention has been made in an effort to provide a transmission opportunity allocating method and device for fairly providing a service in a communication system having multi-rates.

In an exemplary method for allocating a transmission opportunity (TXOP) to a plurality of terminals from a base station of a communication system according to an embodiment of the present invention, the amount of transmittable data of the respective terminals during a first TXOP allocated to the respective terminals is calculated based on data rates of the respective terminals, an average data amount for the respective terminals is calculated from the calculated amount of data, and a second TXOP of the respective terminals is calculated based on the average data amount to allocate the second TXOP to the corresponding terminal.

An exemplary device for allocating a transmission opportunity (TXOP) to a plurality of terminals from a base station of a communication system according to an embodiment of the present invention includes a TXOP allocating unit, an average data amount calculating unit, a TXOP calculating unit, and a TXOP allocating unit. The TXOP allocating unit allocates a first TXOP to transmission data of the respective terminals. The average data amount calculating unit calculates an average data amount of the plurality of terminals based on a data rate of the respective terminals during the first TXOP. The TXOP calculating unit calculates a second TXOP of the respective terminals based on the calculated average data amount. The TXOP allocating unit allocates the second TXOP to the corresponding terminal.

An exemplary recording medium of a communication system for allocating a transmission opportunity (TXOP) to a plurality of terminals according to an embodiment of the present invention includes a program for realizing a method. In the method, a first TXOP is allocated to the respective terminals, an average data amount of the plurality of terminals during the first TXOP is calculated, and a second TXOP of the respective terminals is calculated based on the average data amount and the second TXOP is allocated to the corresponding terminal.

DETAILED DESCRIPTION OF THE EMBODIMENTS

Figure 1:
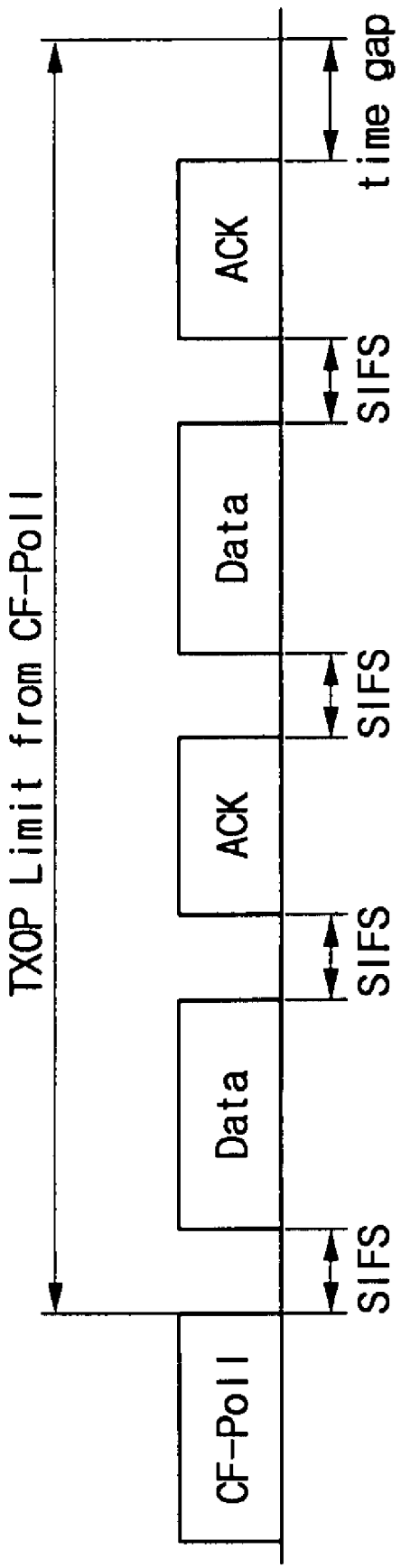
FIG. 1 shows a diagram representing a transmission opportunity (TXOP) in an IEEE802.11e standard.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise", and variations such as "comprises" or "comprising", will be understood to imply the inclusion of stated elements but not the exclusion of any other elements. In addition, each block will be understood to indicate a unit for processing a predetermined function or operation, which may be realized by hardware, software, or a combination thereof.

An adaptive transmission opportunity allocation method and device according to an exemplary embodiment of the present invention in a communication system will be described with reference to the figures. A wireless local area network (LAN) system having multi-data rates, particularly a multi-rate IEEE 802.11e wireless LAN system, will be exemplified in the exemplary embodiment of the present invention, but it is not limited thereto, and another communication system may be applied in the exemplary embodiment of the present invention.

Firstly, the multi-rate IEEE 802.11e wireless LAN system according to the exemplary embodiment of the present invention will be described with reference to FIG. 2.

Figure 2:
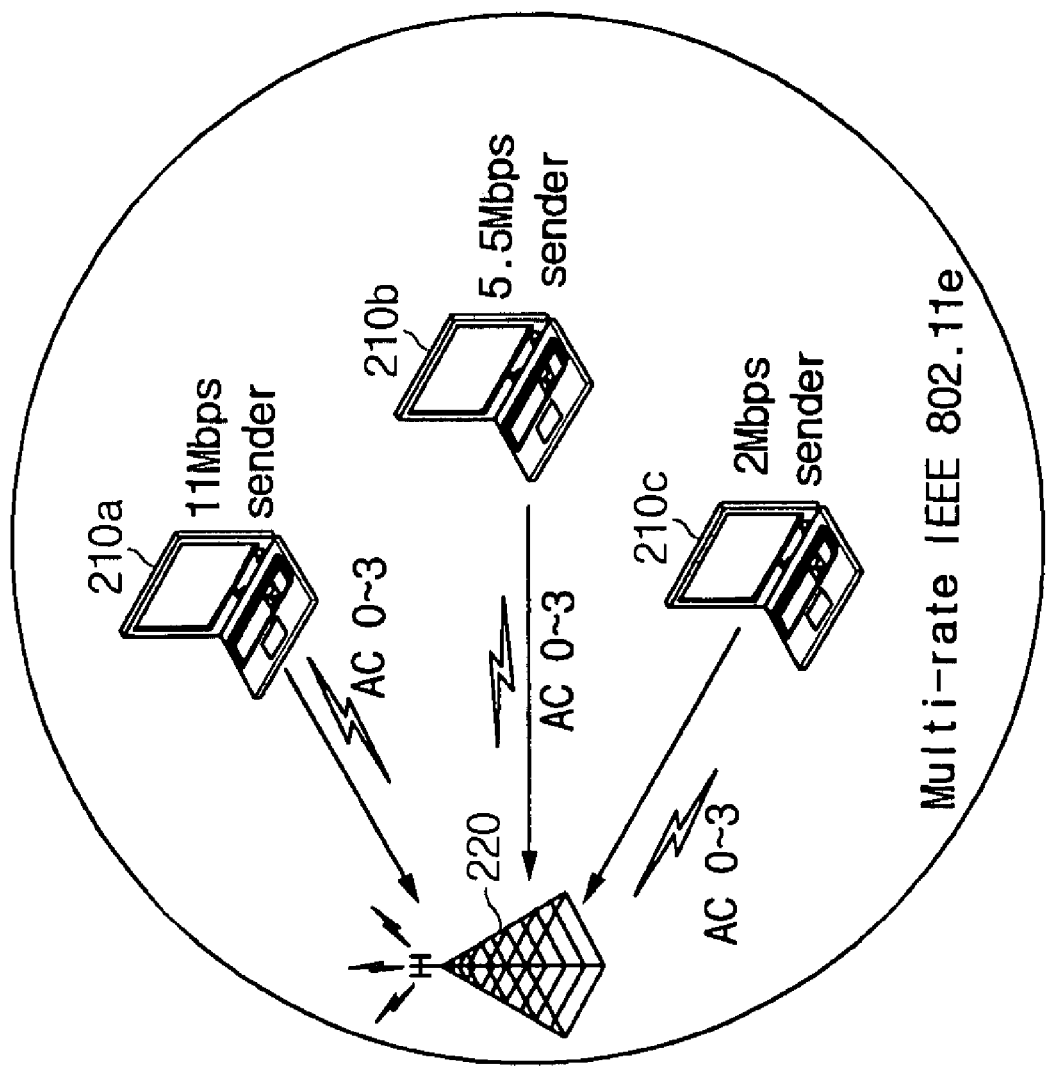
FIG. 2 schematically shows a diagram representing a multi-rate IEEE 802.11e wireless local area network (LAN) system.

FIG. 2 schematically shows a diagram representing the multi-rate IEEE 802.11e wireless LAN system.

As shown in FIG. 2, the multi-rate IEEE 802.11e wireless LAN system 200 includes a plurality of terminals 210a, 210b, and 210c, and an access point (AP) 220.

The plurality of terminals 210a, 210b, and 210c for receiving a service perform a data transmitting/receiving function for accessing the AP 120 to transmit/receive data. The terminals 210a, 210b, and 210c respectively have data rates. In FIG. 2, it is illustrated that three terminals 210a, 210b, and 210c are provided in one AP area, and the terminal 210a has an 11 Mbps transmission speed, the terminal 210b has a 5.5 Mbps transmission speed, and the terminal 210c has a 2 Mbps transmission speed.

The AP 220 for connecting a wireless network and a wired network to support wireless access and network connection of the terminals 210a, 210b, and 210c directly provides a data service to the plurality of terminals 210a, 210b, and 210c at an end of the wired network through a wireless interface, and performs an initial access function, a handover control function between sectors, and a quality of service (QoS) control function.

A transmission opportunity allocation method and device in the communication system according to the exemplary embodiment of the present invention will be described with reference to FIG. 3 to FIG. 5.

Figure 3:
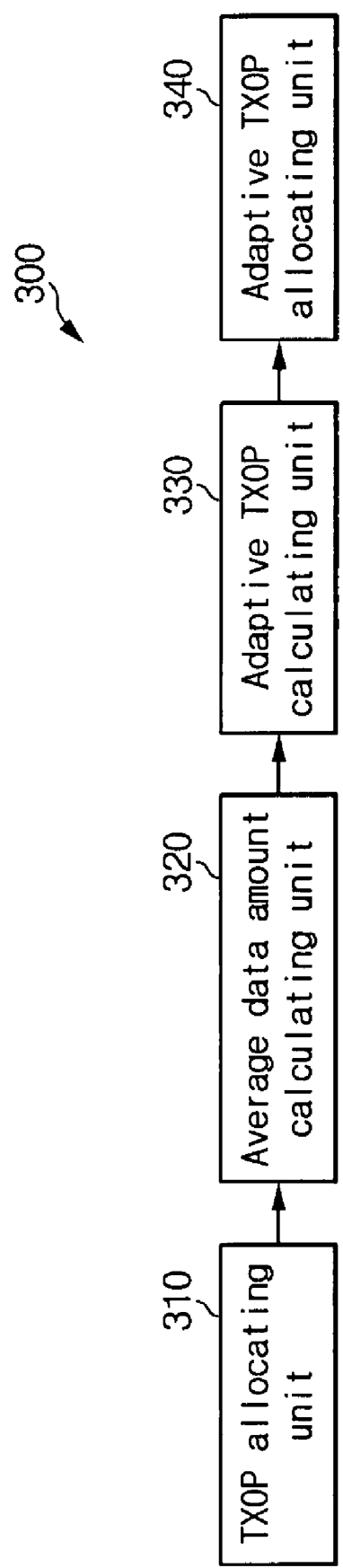
FIG. 3 shows a diagram representing a transmission opportunity allocation device in a communication system according to an exemplary embodiment of the present invention.

FIG. 3 shows a diagram representing a transmission opportunity allocation device in the communication system according to the exemplary embodiment of the present invention.

As shown in FIG. 3, the transmission opportunity allocation device 300 includes a transmission opportunity (TXOP) allocating unit 310, an average data amount calculating unit 320, an adaptive TXOP calculating unit 330, and an adaptive TXOP allocating unit 340. The transmission opportunity allocation device 300 is located in the AP 220 of the communication system, and adaptively allocates a TXOP according to the data rates of the terminals 210a, 210b, and 210c to allocate the TXOP to the respective terminals 210a, 210b, and 210c.

The TXOP allocating unit 310 respectively allocates a fixed TXOP to the terminals 210a, 210b, and 210c. The respective terminals 210a, 210b, and 210c use the fixed TXOP to continuously transmit a plurality of frames for a predetermined time without a contention from access categories (AC) according to a QoS of data. For example, in the IEEE 802.11e, a differentiated access control function is provided in a sharing medium to transmit data providing the QoS. To provide the differentiated access control function, 8 priorities 0 to 7 used in the IEEE 802.11d and 4 ACs induced from the priorities are used.

The average data amount calculating unit 320 calculates average data for the same priority of all the terminals based on the given TXOP according to the respective AC and the data rates of the respective terminals 210a, 210b, and 210c. That is, the average data amount calculating unit 320 calculates data to be transmitted from the respective terminals 210a, 210b, and 210c during the given TXOP, and calculates an average transmittable data amount of all the terminals for the same priority during the same TXOP. In this case, the average data amount calculating unit 320 calculates respective times for transmitting one datum from the respective terminals 210a, 210b, and 210c based on the data rates of the terminals 210a, 210b, and 210c, and calculates the number of transmittable data during the given TXOP of the respective terminals 210a, 210b, and 210c. The average data amount calculating unit 320 calculates the average data amount by averaging the sums of the transmittable data of the respective terminals 210a, 210b, and 210c.

The adaptive TXOP calculating unit 330 calculates an adaptive TXOP of the respective terminals 210a, 210b, and 210c that corresponds to the number of the average data calculated by the average data amount calculator 220.

The adaptive TXOP allocating unit 340 respectively allocates the calculated adaptive TXOP of the respective terminals 210a, 210b, and 210c to the corresponding terminals 210a, 210b, and 210c.

That is, when the AC is i, the adaptive TXOP allocated to the respective terminals 210a, 210b, and 210c is given as Math FIG. 1.

$$\text{rate-adaptive}TXOP^j[AC=i] = \text{Avg}(K[AC=i]) \times (t^j_{data}[AC=i]) \qquad \text{[Math FIG. 1]}$$

In Math FIG. 1, rate-adaptiveTXOP$^j$[AC=i] denotes an adaptive TXOP of a $j^{th}$ terminal, $t^j_{data}$[AC=i] denotes a one datum transmission time of the $j^{th}$ terminal, and Avg(K[AC=i]) denotes the amount of the average data transmitted from all the terminals during a given TXOP.

The one datum transmission time $t^j_{data}$[AC=i] and the average data amount Avg(K[AC=i]) are respectively given as Math Fig. 2 and Math FIG. 3.

$$k^j[AC=i] = t^j_{TXOP[AC=i]} / t^j_{data}[AC=i] \quad \text{[Math FIG. 2]}$$

$$\text{Avg}(K[AC=i]) = \Sigma k^j[AC=i]/N \quad \text{[Math FIG. 3]}$$

In Math FIG. 2, $k^j[AC=i]$ denotes a data transmission amount of the $j^{th}$ terminal during the given TXOP when the AC is i, and $t^j_{TXOP[AC=i]}$ denotes the given TXOP of the $j^{th}$ terminal when the AC is i. In Math FIG. 3, N denotes the number of terminals.

In the exemplary embodiment of the present invention, it is assumed that the $j^{th}$ terminal transmits at least one datum when $k^j[AC=i]$: is less than 1 in Math FIG. 2. When the average data amount is less than 1 in Math FIG. 3, the average data amount allocated to the terminal may be determined to be 1.

Figure 4A:
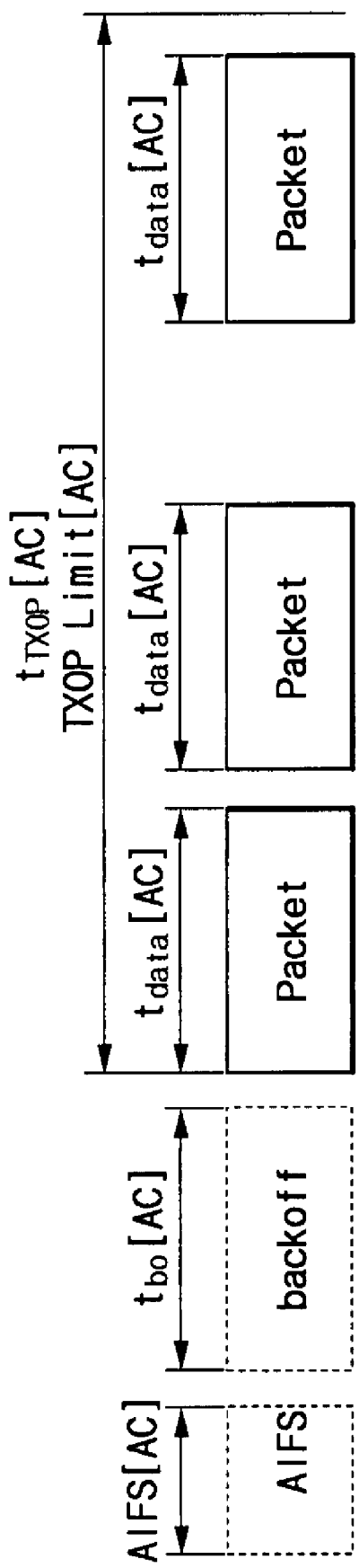
FIG. 4A to FIG. 4C schematically show diagrams representing frame transmission within the TXOP in the communication system according to the exemplary embodiment of the present invention.
Figure 4B:
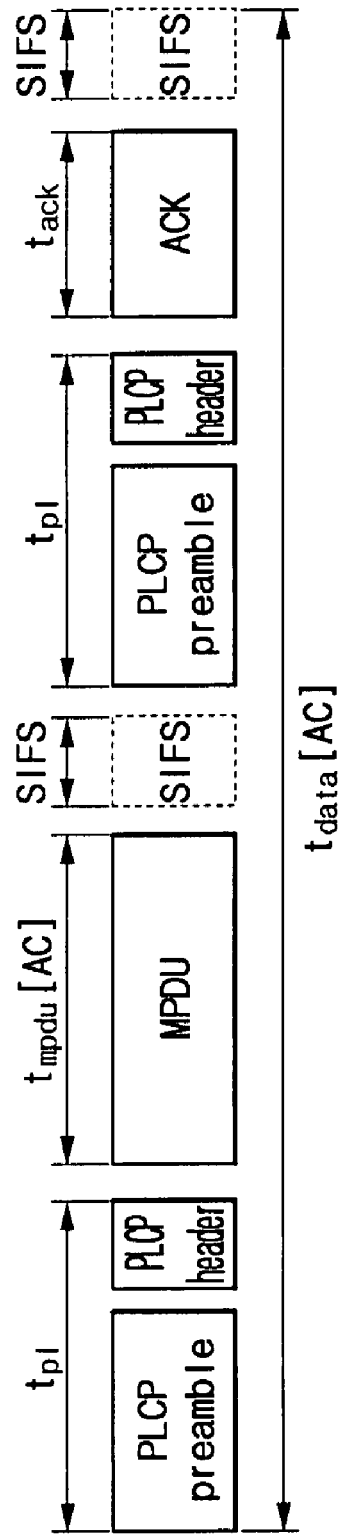
Figure 4C:
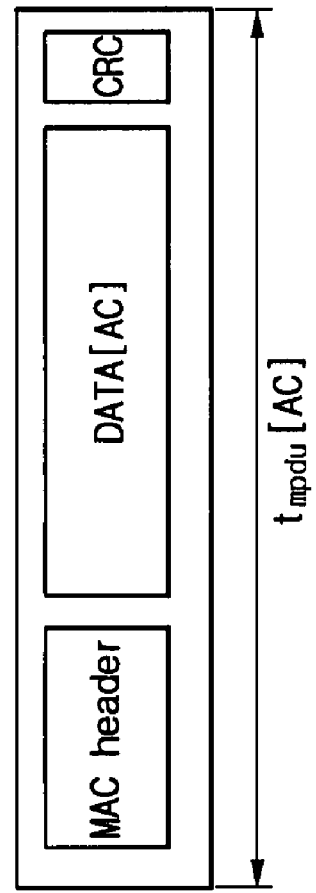

FIG. 4A to FIG. 4C schematically show diagrams representing frame transmission in the TXOP in the communication system according to the exemplary embodiment of the present invention.

As shown in FIG. 4A, the terminals 210a, 210b, and 210c may transmit various packet frames respectively having $t_{data}$[AC] lengths within the fixed TXOP value $t_{TXOP}$[AC] allocated by the TXOP allocating unit 310. In this case, an arbitration interframe space AIFS[AC] and a backoff $t_{bo}$[AC] are provided in front of the TXOP $t_{TXOP}$[AC], and lengths of the AIFS and the backoff may be controlled according to the respective ACs. For example, 4 priority cues relating to the AC are provided in the IEEE 802.11e to support the QoS. The priority is provided to a packet in each cue according to a type thereof, and a parameter used to provide a differentiated service to the packets is the AIFS.

As shown in FIG. 4B, one frame $t_{data}$[AC] according to the AC includes a physical header $t_{pl}$ provided in front of a medium access control (MAC) protocol data unit (MPDU) that is a data frame. The physical header $t_{pl}$ includes a physical layer convergence protocol (PLCP) preamble and a PLCP header. The PLCP preamble is used to synchronize signal transmission timing, and the PLCP header is used to determine the transmission speed. Accordingly, the data are transmitted with the data rate determined in the PLCP header. Since the transmission speed of a data frame is negotiated by using the physical header, it is defined that the physical header is transmitted with the lowest speed. The physical header including the PLCP preamble and the PLCP header is provided in front of an acknowledgement (ACK) frame $t_{ack}$, and the ACK frame $t_{ack}$ is transmitted after an SIFS time after transmitting the MPDU $t_{mpdu}$[AC] that is the data frame. 14 bites may be allocated to the ACK frame. The SIFS is a time period before the ACK frame is transmitted after one data frame is transmitted, and it provides a highest priority level among IFSs. In addition, the SIFS has a fixed value according to a physical layer based on a time period from a time transmitting a frame by the terminal to a time for receiving another frame by the terminal.

In addition, as shown in FIG. 4C, the MPDU $t_{mpdu}$[AC] that is the data frame includes a MAC header, data, and a cyclic redundancy check (CRC). That is, the MAC header is provided in front of the data, and the CRC is provided after the data. In this case, 24 to 32 bites may be allocated to the MAC header, and 4 bites may be allocated to the CRC.

Figure 5:
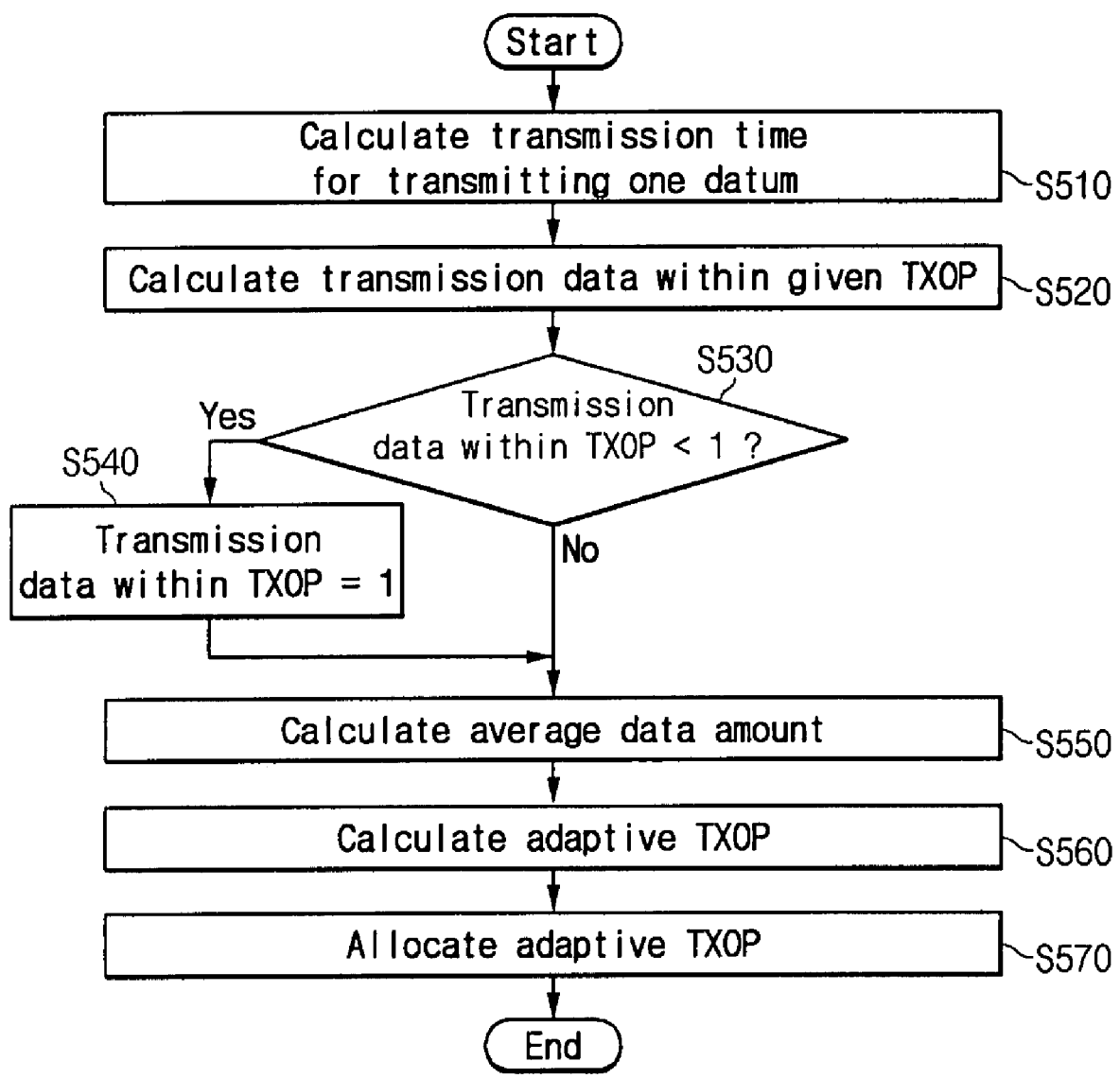
FIG. 5 shows a diagram representing an operation of an adaptive transmission opportunity allocation device according to the exemplary embodiment of the present invention.

FIG. 5 shows a diagram representing an operation of the adaptive transmission opportunity allocation device according to the exemplary embodiment of the present invention.

As shown in FIG. 5, the average data amount calculating unit 320 in FIG. 2 calculates the time for transmitting one datum by the respective terminals based on the data rates of the respective terminals in step S510. The average data amount calculating unit 320 calculates the amount of the transmittable data of the respective terminals during the TXOP allocated from the AC according to the QoS in step S520. In addition, the average data amount calculating unit 320 compares the transmittable data of the terminals during the TXOP to a reference value of 1 in step S530, and establishes in step S540 that the respective terminals transmit at least one datum when the calculated amount of transmittable data is less than 1.

Further, the average data amount calculating unit 320 calculates the average transmittable data amount of the terminals during the TXOP based on the transmittable data of the terminal during the TXOP in step S550. The adaptive TXOP calculating unit 330 in FIG. 3 calculates the adaptive TXOP of the respective terminals based on the calculated average data amount and a time for transmitting one datum by the respective terminals in step S560. The adaptive TXOP allocating unit 340 allocates the adaptive TXOP to the respective terminals in step S570. Accordingly, since the TXOP is fairly allocated to the terminals, a service may be fairly provided.

According to the exemplary embodiment of the present invention, since a problem of unfairness caused by different data rates of the respective terminals in the communication system is solved, the service may be fairly provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

What is claimed is:

1. A method performed in a device for allocating a Transmission Opportunity (TXOP) to a plurality of terminals from a base station of a communication system, the method comprising:

calculating, by an average data amount calculating unit, based on data rates of each respective terminal of the plurality of terminals, amount of data transmittable by each of the respective terminals during a first TXOP allocated to the respective terminals;

calculating, by the average data amount calculating unit, an average of the data amounts for the respective terminals from the calculated amount of data;

calculating, by an adaptive TXOP calculating unit, a second TXOP for each of the respective terminals based on the average data amount; and allocating, by an adaptive TXOP allocating unit, the second TXOP to the respective terminals, wherein calculating the amount of transmittable data comprises:

calculating a transmission time for transmitting one datum from the respective terminals based on the data rates of the respective terminals, wherein a datum is a predetermined unit of data; and calculating the amount of data to be transmitted during the first TXOP of the respective terminals based on a value obtained by dividing the first TXOP by the transmission time of the respective terminals, wherein the average data amount is established to be 1 datum when the calculated average data amount is less than 1 datum, wherein a datum is a predetermined unit of data.

2. The method of claim 1, wherein the first TXOP is allocated the respective terminals according to a Quality of Service (QoS) for transmission data of the respective terminals.

3. The method of claim 1, wherein the calculating of the amount of transmittable data further comprises establishing the amount of transmittable data of the corresponding terminal to be 1 datum when the value obtained by dividing the first TXOP by a first time is less than 1 datum.

4. The method of claim 1, wherein the average data amount is calculated from an average of the amounts of transmittable data of the respective terminals during the first TXOP.

5. The method of claim 1, wherein the second TXOP of the respective terminals is calculated based on the average data amount and the transmission time of the respective terminals.

6. A device for allocating a Transmission OPportunity (TXOP) to a plurality of terminals from a base station of a communication system, the device comprising:
   a TXOP allocating unit for allocating a first TXOP to transmission data of the respective terminals;
   an average data amount calculating unit for calculating, based on a data rate of each of the respective terminals of the plurality of terminals, an average amount of data transmittable by the plurality of terminals during the first TXOP;
   a TXOP calculating unit for calculating a second TXOP for each of the respective terminals based on the calculated average data amount; and
   a TXOP allocating unit for allocating the second TXOP to the respective terminals,
   wherein the average data amount calculating unit calculates a transmission time for transmitting a datum from the respective terminals based on the data rate of the respective terminals, and calculates the amount of transmittable data of the respective terminals based on the transmission time and the first TXOP, wherein a datum is a predetermined unit of data, and
   wherein the average data amount is established to be 1 datum when the calculated average data amount is less than 1 datum, wherein a datum is a predetermined unit of data.

7. The device of claim 6, wherein the TXOP allocating unit determines the first TXOP for the respective terminals according to a Quality of Service (QoS) for the transmission data of the respective terminals.

8. The device of claim 6, wherein the average data calculating unit calculates the average data amount for the plurality of terminals from the amount of transmittable data of the respective terminals.

9. The device of claim 6, wherein the TXOP calculating unit calculates the second TXOP of the respective terminals from a product of the transmission time of the respective terminals and the average data amount.

10. A non-transitory recording medium of a communication system for allocating a Transmission Opportunity (TXOP) to a plurality of terminals, the recording medium comprising a program to be executed within a device of the communication system for realizing a method comprising:
    allocating, by a TXOP allocating unit, a first TXOP to the respective terminals;
    calculating, by an average data amount calculating unit, an average amount of data transmittable by each respective terminal of the plurality of terminals during the first TXOP;
    calculating, by an adaptive TXOP calculating unit, a second TXOP for each of the respective terminals based on the average data amount; allocating, by the adaptive TXOP allocating trait, the second TXOP to the respective terminals; and
    calculating the amount of transmittable data of the respective terminals during the first TXOP based on a data rate of the respective terminals; and
    calculating the average data amount for the plurality of terminals from the amount of transmittable data of the respective terminals.
    wherein the average data amount is established to be 1 datum when the calculated average data amount is less than 1 datum, wherein a datum is a predetermined trait of data.

11. The recording medium of claim 10, wherein the first TXOP for the respective terminals is determined according to a Quality of Service (QoS) for transmission data of the respective terminals.

* * * * *